United States Patent
Lee et al.

(10) Patent No.: US 7,734,922 B2
(45) Date of Patent: Jun. 8, 2010

(54) METHOD, SYSTEM AND TERMINAL APPARATUS FOR ENABLING CONTENT TO BE REPRODUCED IN MULTIPLE TERMINALS

(75) Inventors: Byung-Rae Lee, Seoul (KR); Wuk Kim, Gwacheon-si (KR); Jun-Hwan Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1059 days.

(21) Appl. No.: 11/434,095

(22) Filed: May 15, 2006

(65) Prior Publication Data

US 2007/0037555 A1    Feb. 15, 2007

(30) Foreign Application Priority Data

Aug. 12, 2005    (KR) .................. 10-2005-0074532

(51) Int. Cl.
H04L 9/32    (2006.01)
H04N 7/16    (2006.01)
H04M 3/42    (2006.01)

(52) U.S. Cl. .................. 713/171; 713/169; 726/26; 455/411

(58) Field of Classification Search .................. 726/26; 713/169, 171; 455/411
See application file for complete search history.

(56) References Cited

U.S. PATENT DOCUMENTS

| | | | |
|---|---|---|---|
| 6,477,366 B1 * | 11/2002 | Valentine et al. ............ | 455/416 |
| 7,239,704 B1 * | 7/2007 | Maillard et al. ............ | 380/210 |
| 7,254,714 B2 * | 8/2007 | Ho et al. ..................... | 713/182 |
| 7,496,381 B2 * | 2/2009 | Kim .......................... | 455/558 |
| 2003/0112977 A1 * | 6/2003 | Ray et al. ................... | 380/270 |
| 2003/0135748 A1 * | 7/2003 | Yamada et al. .............. | 713/193 |
| 2004/0157584 A1 * | 8/2004 | Bensimon et al. ........... | 455/411 |
| 2004/0223513 A1 * | 11/2004 | Meago ........................ | 370/468 |
| 2005/0020308 A1 * | 1/2005 | Lai .............................. | 455/558 |
| 2005/0078824 A1 * | 4/2005 | Malinen et al. ............. | 380/247 |
| 2005/0117743 A1 * | 6/2005 | Bender et al. ................. | 380/28 |
| 2005/0149740 A1 * | 7/2005 | Kotzin et al. ................ | 713/185 |
| 2005/0221801 A1 * | 10/2005 | Liu et al. ..................... | 455/411 |
| 2006/0205388 A1 * | 9/2006 | Semple et al. ............. | 455/411 |
| 2006/0281442 A1 * | 12/2006 | Lee et al. ................. | 455/412.2 |

FOREIGN PATENT DOCUMENTS

| KR | 1020010015040 A | 2/2001 |
|---|---|---|
| KR | 1020030100424 | 7/2005 |

\* cited by examiner

*Primary Examiner*—Michael Pyzocha
(74) *Attorney, Agent, or Firm*—The Farrell Law Firm, LLP

(57) ABSTRACT

Disclosed are a method, a system and a terminal apparatus for reproducing content purchased by a user in a plurality of terminals. To this end, a Right Object (RO) is received through an authentication process for content and a service registration process, and is stored in a User Identity Module (UIM). If the UIM is used, a user can use corresponding content in a plurality of terminals through one-time registration. Accordingly, the user having completed the registration can reproduce content in multiple terminals owned by the user based on user identification by means of a license acquired through the registration regardless of a specific terminal, instead of reproducing the content only in a single terminal to which a license has been bound.

21 Claims, 10 Drawing Sheets

FIG.5A

| ID_SP | RND 1 | TS 1 |

FIG.5B

| ID_SP | RND 1 | TS 1 | ID_U | MAC1 (ID_SP || RND1 || TS1 || ID_U) |

FIG.5C

| ID_SP | RND 1 | TS 1 | ID_U | MAC1 (ID_SP || RND1 || TS1 || ID_U) | ID_T | MAC2 (ID_SP || RND1 || TS1 || ID_T) |

FIG.5D

| Proof_U | Proof_T | TS 2 | E(KU, KUS || KUT) | MAC1 (E(KU, KUS || KUT) || Proof_T || TS2) | E(KT, KUT) | MAC2 (E(KT, KUT) || Proof_U || TS2) |

| ID_SP | RND 1 | TS 1 | ID_U | MAC1 (ID_SP || RND1 || TS1 || ID_U) | ID_T | Sign_T(ID_SP || RND1 || TS1 || ID_T) |

FIG.6A

| Proof_U | Proof_T | TS 2 | E(KU, KUS || KUT) | MAC1 (E(KU, KUS || KUT) || Proof_T || TS2) | E(PK_T, KUT) | Sign_SP(E(PK_T, KUT) || Proof_U || TS2) |

| ID_T | RND 1 | TS 1 | ID_Service |
|---|---|---|---|

FIG.10B

| ID_T | RND 1 | TS 1 | ID_Service | ID_U | MAC1 (ID_T || RND1 || TS1 || ID_Service || ID_U) |
|---|---|---|---|---|---|

FIG.10C

| ID_SP | Result | TS 2 | MAC1 (ID_SP || TS2) |
|---|---|---|---|

METHOD, SYSTEM AND TERMINAL APPARATUS FOR ENABLING CONTENT TO BE REPRODUCED IN MULTIPLE TERMINALS

PRIORITY

This application claims priority to applications entitled "Method, System And Terminal Apparatus For Enabling Content To Be Reproduced In Multiple Terminals" filed in the Korean Industrial Property Office on Aug. 12, 2005, and assigned Serial No. 2005-74532, the contents of which are incorporated herein by reference.

BACKGROUND OF THE INVENTION

1. Field of the Invention

The present invention relates to a method, a system and a terminal apparatus for enabling content purchased by a user to be reproduced in a plurality of terminals by means of a User Identity Module (UIM).

2. Description of the Related Art

With the rapid development of wireless Internet technology and wireless communication technology, a mobile communication terminal user can use various services such as data services and Internet services through both a UIM, which is a module proving the user's own identity, and a terminal. However, such services show a tendency to gradually change into charged services. In order to protect such services, Digital Rights Management (DRM) technology has been gradually introduced.

Such DRM technology corresponds to a representative security technique for protecting content, which stipulates use rights for controlling the use of content. Such DRM technology basically permits encrypted content to be freely distributed among users, but a user's Right Object (RO) is required in order to execute corresponding content. Further, with the increase in the use of a content service due to the development of information communication, unexpected damages have occurred due to the increase in inappropriate copying and distribution. In order to prevent such damages, services of DRM technology based on flexibility and convenience for a user's RO have placed an importance on security in which only permitted users can use a corresponding service. In order to accomplish such security, it is necessary to perform an authentication process for verifying that each user terminal is permitted to have access to a given service.

Generally, mutual authentication is performed only between a terminal and a service provider, and the service provider transfers an RO only to the terminal. Such an RO is designated to be used only by a corresponding terminal. When the RO is to be transferred to or shared by other terminals, the RO can be transferred only to or shared only by specific terminals which have been designated in advance.

FIG. 1 is a block diagram illustrating a general authentication process using a UIM in a Multimedia Broadcast and Multicast Service (MBMS).

Referring to FIG. 1, if authentication is performed between the UIM 30 and a service provider 10, the service provider 10 transfers a Service Key (SK) and a Traffic Key (TK) for decrypting a broadcast service to the UIM 30 through a terminal 20. Then, if the service provider 10 provides the terminal 20 with an encrypted service, the terminal 20 decrypts and executes the encrypted service by means of the keys provided from the UIM 30, so that a user can enjoy multimedia information within the content of the service. The authentication process using the UIM is performed as described above, and the details have been clearly defined in 3GPP TSs 33.220 and 33.102.

As described above, up to the present time, content protection technology has been realized through an authentication process between a service provider and one terminal, etc. However, a detailed method has not yet been proposed for content protection-related standard technology for multiple terminals using a broadcast service in a mobile communication environment. Therefore, a method does not currently exist for reproducing a broadcast service, which a user has joined, in a plurality of terminals by means of a UIM.

SUMMARY OF THE INVENTION

Accordingly, the present invention has been made to solve at least the above-mentioned problems occurring in conventional systems, and an object of the present invention is to provide a method, a system and a terminal apparatus for enabling content purchased by a user to be reproduced in a plurality of terminals utilizing a UIM.

In order to accomplish this object, in accordance with one aspect of the present invention, there is provided a method for reproducing equal content in at least one terminal by generally authenticating a service provider, a terminal and a User Identity Module (UIM), the method including performing by the terminal and the UIM mutual authentication through the service provider, thereby acquiring an encryption key shared between the terminal and the UIM; after the authentication, performing by the UIM registration to the service provider through the terminal; if the registration is completed, transferring by the UIM a service join request message to the service provider through the terminal, thereby joining a service; and if encrypted content is transferred from the terminal to the service provider after joining the service, decrypting and reproducing the encrypted content by means of the shared encryption key.

In order to accomplish this object, in accordance with another aspect of the present invention, there is provided a system for reproducing equal content in at least one terminal by generally authenticating a service provider, a terminal and a User Identity Module (UIM), the system including the service provider for performing authentication for the terminal and the UIM, performing a registration process for allowing the UIM to be used in the at least one terminal, reporting results for a service join request from the UIM through the terminal, and encrypting and providing corresponding content in service joining; the terminal for transferring a message exchanged between the service provider and the UIM, acquiring a shared encryption key with the UIM through the authentication, and decrypting and reproducing the encrypted content, which is provided according to the service joining, using the shared encryption key; and the UIM for acquiring both a shared encryption key with the terminal and a shared session key with the service provider through the authentication, and providing the terminal with an encryption key for decrypting the encrypted content.

In order to accomplish this object, in accordance with a further aspect of the present invention, there is provided a terminal apparatus for reproducing equal content in at least one terminal by generally authenticating a service provider, a terminal and a User Identity Module (UIM), the terminal apparatus including a Digital Rights Management (DRM) module for managing registration, service joining, and use of content; a communication module for receiving a message from the service provider, and transmitting a response message to the service provider in response to reception of the message; an interface module for transferring the message received through the communication module to the UIM, and receiving a response message corresponding to the transferred message from the UIM; and an authentication module for acquiring a shared encryption key with the UIM by performing authentication for the UIM, and decrypting encrypted content, which is provided according to the service joining, using the shared encryption key.

BRIEF DESCRIPTION OF THE DRAWINGS

The above and other objects, features and advantages of the present invention will be more apparent from the following detailed description taken in conjunction with the accompanying drawings, in which:

FIGS. 5A-5D are diagrams illustrating the format of a message exchanged among a service provider, a terminal and a UIM according to one embodiment of the present invention;

FIGS. 6A and 6B are diagrams illustrating the format of a message exchanged among a service provider, a terminal and a UIM according to another embodiment of the present invention;

FIGS. 10A-10C are diagrams illustrating the format of a message exchanged in a service termination process according to the present invention.

DETAILED DESCRIPTION OF THE PREFERRED EMBODIMENTS

Figure 1:
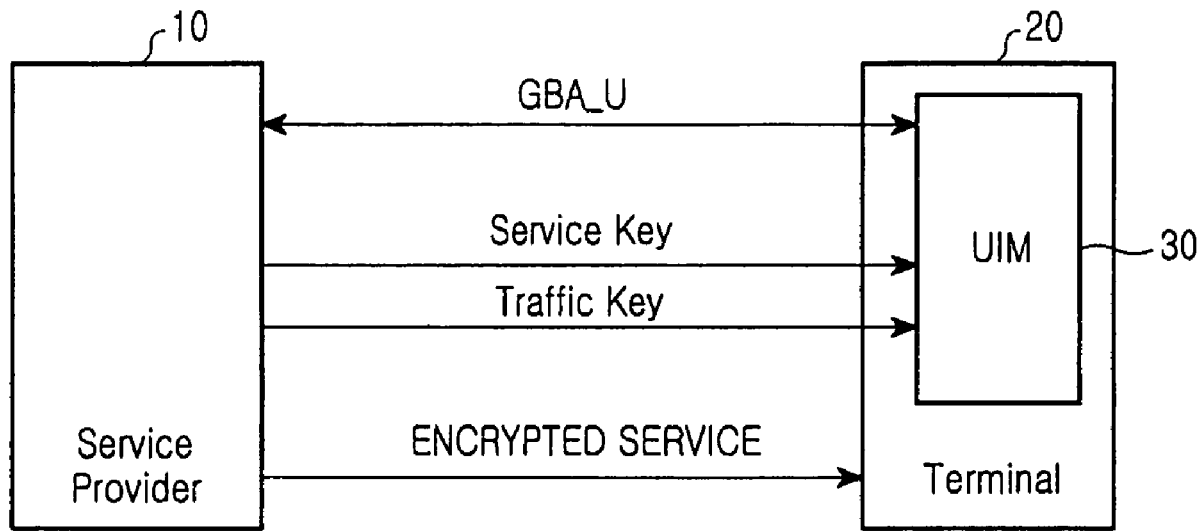
FIG. 1 is a block diagram illustrating a general authentication process using a UIM in a MBMS.

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

The present invention implements a function for enabling content purchased by a user to be reproduced in a plurality of terminals. To this end, in the present invention, a Right Object (RO) is received through an authentication process for content and a service registration process, and is stored in a User Identity Module (UIM). If the UIM is used, a user can use corresponding content in a plurality of terminals through one-time registration. Accordingly, the user having completed the registration can reproduce content in multiple terminals owned by the user based on user identification utilizing a license acquired through the registration regardless of a specific terminal, instead of reproducing the content only in a single terminal to which a license has been bound.

Hereinafter, function-by-function entities, which enable content to be reproduced utilizing a license acquired through a trigger registration process for allowing the content to be commonly used in a plurality of terminals, according to an embodiment of the present invention will be described with reference to FIG. 2, which illustrates the structure of a system for performing the trigger registration process according to the present invention.

Figure 2:
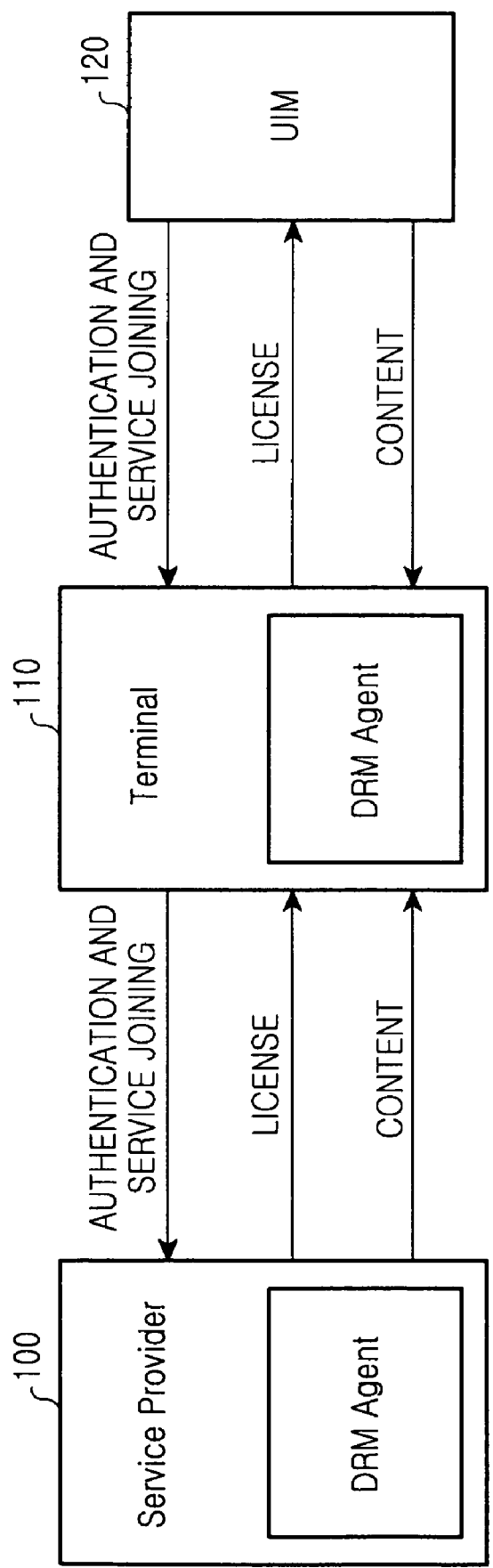
FIG. 2 is a block diagram illustrating the structure of a system for performing a trigger registration process according to of the present invention.

As illustrated in FIG. 2, a service provider 100 authenticates and generally manages a user terminal 110 and a UIM 120, generates an RO for the use of content, i.e. license, and issues the RO to a user having completed a trigger registration process including service joining, etc. As describe above, if authentication and service joining are performed among the service provider 100, the user terminal 110 and the UIM 120 through the trigger registration process, the service provider 100 provides the content to terminals to which the use of such content has been permitted.

The terminal 110 corresponds to a device interworking with the UIM 120, and reproduces content utilizing the RO provided from the service provider 100. The UIM 120 corresponds to a module representing the identification of a user, which may include a smart card, a token, a SIM, various removable medias, memory cards having other security functions, etc.

Figure 3:
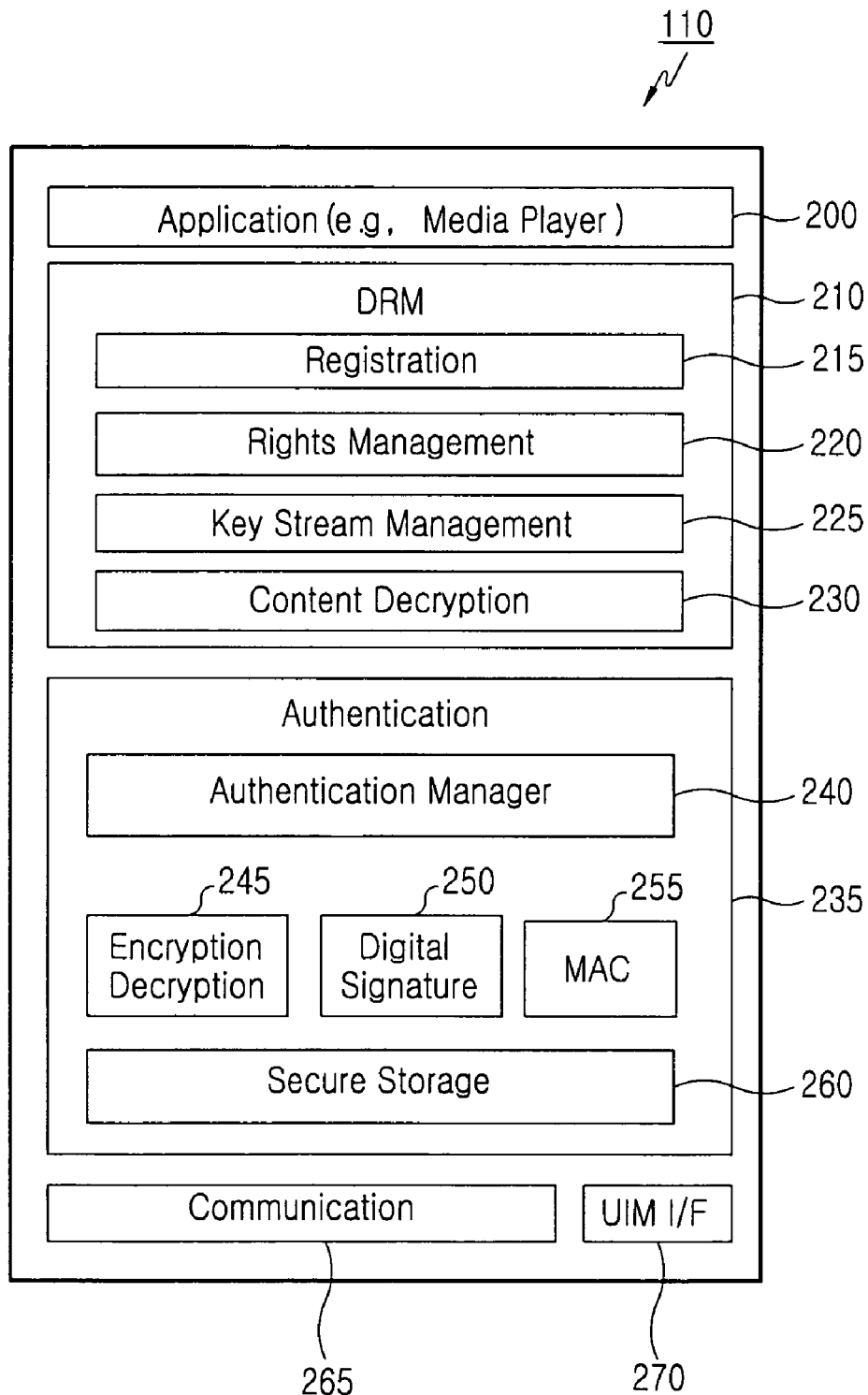
FIG. 3 is a block diagram illustrating the structure of a terminal according to the present invention.

FIG. 3 is a block diagram illustrating the structure of the terminal according to the present invention. In FIG. 3, the terminal 110, to which the present invention is applied, largely includes an application module 200, a DRM module 210, an authentication module 235, a communication module 265 and a UIM I/F (Interface) module 270.

The application module 200 is a module like a media player, and serves to reproduce decrypted content provided from the DRM module 210. The DRM module 210 functions to manage registration, service joining, and use of content.

The authentication module 235 includes an authentication manager 240 for taking charge of the overall protocol execution and managing an authentication function, and sub-modules of the authentication manager 240. The sub-modules of the authentication manager 240 include an encryption/decryption module 245 for executing encryption and decryption operations, a digital signature module 250 for signing an electronic signature of a terminal, a Message Authentication Code (MAC) module 255 for executing an MAC operation, and a secure storage module 260 for safely storing an encryption key, etc. The authentication manager 240 performs message generation and verification utilizing the sub-modules.

The authentication module 235 having the construction as described above adds information for terminal authentication to a response message, which is received from the UIM 120, and transmits the response message to the service provider 100. Further, the authentication module 235 performs authentication for the UIM 120 utilizing an authentication execution result message for the UIM 120 and the terminal 110, which is received from the service provider 100 in response to the transmission of the response message, and transfers the result message to the UIM 120 so that authentication for the terminal 110 is performed by the UIM 120. In this way, the authentication module 235 performs the authentication for the UIM 120, thereby acquiring an encryption key shared with the UIM 120. The shared encryption key will be referred to as a KUT, such as a symmetric key, as described later in detail.

The DRM module 210 includes a registration module 215, a rights management module 220, a key stream management module 225 and a content decryption module 230. Of them, the registration module 215 executes operations according to a registration procedure, the rights management module 220 manages interpretation and use of an RO acquired in the service joining. The key stream management module 225 executes decryption of an encrypted Traffic Key (TK) by means of a Service Key (SK), and the content decryption module 230 executes decryption of encrypted content by means of the traffic key. The SK functions to encrypt the TK, and the TK functions to actually encrypt content.

The communication module 265 is responsible for transmission/reception with a network. In particular, the communication module 265 functions to receive a message from the service provider 100 and to transmit a response message to the service provider 100 in response to the received message. The UIM interface module 270 takes charge of communication with the UIM 120, transfers the message, which is received through the communication module 265, to the UIM 120, and receives a message generated from the UIM 120.

In order to enable content purchased by a user to be reproduced in a plurality of terminals utilizing the UIM 120 according to the present invention, authentication is required among the service provider 100, the terminal 110 and the UIM 120. Through such authentication, the service provider 100 manages identification information of the UIM 120, and generates a corresponding RO.

The UIM 120 performs a registration process in order to obtain the RO from the service provider 100. The registration process will be described in detail with reference to FIG. 7. If the registration process is completed, it is possible to reproduce content acquired by a user through multiple terminals by means of the UIM 120 such as a smart card which stores its own identification information. According to the present invention, when a user wants to terminate a service which the user has joined, the user can use a registration termination function. Such a service termination process will be described in detail with reference to FIG. 9.

As described above, in order to use content according to the embodiment of the present invention, a user passes through an authentication process through the terminal of the user and the UIM, and then passes through registration and service joining process.

In the meantime, an authentication method according to the embodiment of the present invention may be largely classified as a public key-based mutual authentication method and a symmetric key-based mutual authentication method.

Figure 4:
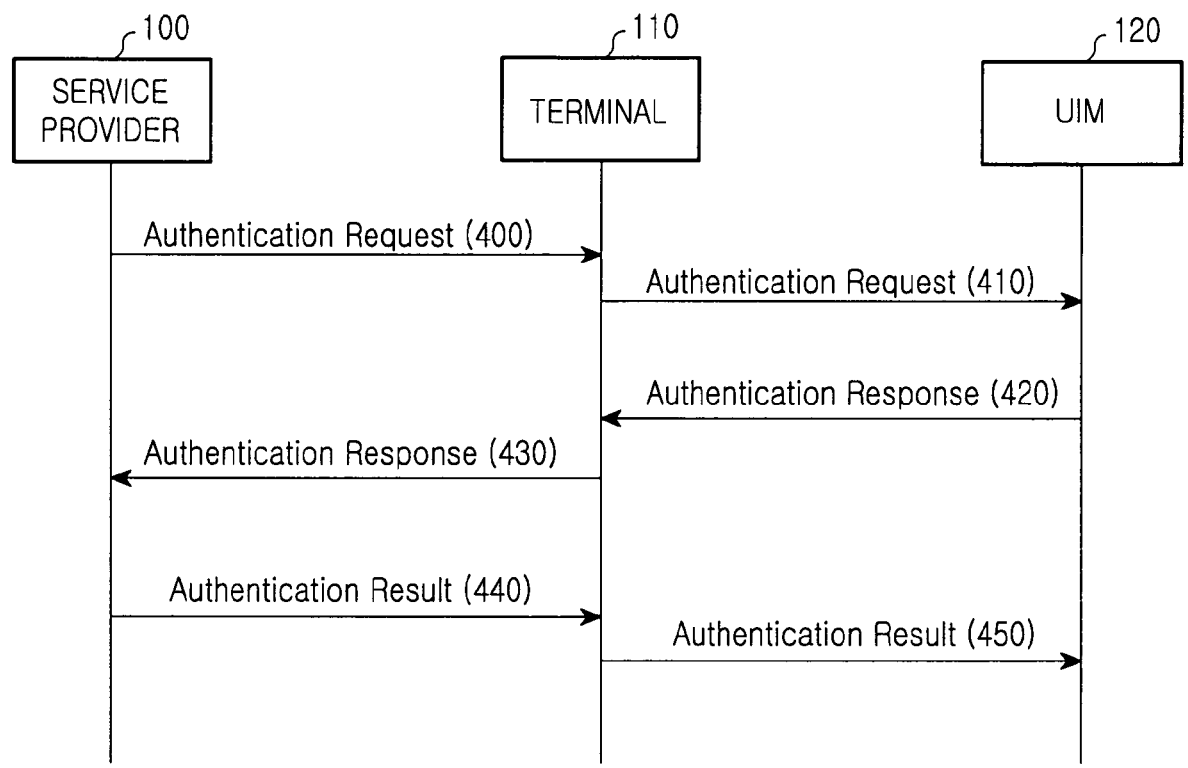
FIG. 4 is a ladder diagram illustrating an authentication process according to the present invention.

Hereinafter, a symmetric key-based authentication process will be described with reference to FIGS. 4 and 5. FIG. 4 is a ladder diagram illustrating the authentication process according to the present invention, and FIG. 5 is a diagram illustrating the format of a message exchanged among the service provider, the terminal and the UIM according to one embodiment of the present invention.

Referring to FIG. 4, in step 400, the service provider 100 transmits an authentication request message to the terminal 110. The authentication request message has an ID_SP field for indicating the identification information of the service provider 100, an RND1 field, which indicates a random number, and a TS1 field for indicating time information, as illustrated in FIG. 5A.

In step 410, the terminal 110 transfers the received authentication request message to the UIM 120. The UIM 120 adds an ID_U field, which indicates the identification information of the UIM 120, to the message received from the service provider 100, and transfers an authentication response message to the terminal 110, wherein the authentication response message is generated by performing a MAC operation utilizing a symmetric key shared between the UIM 120 and the service provider 100. The authentication response message has an ID_SP field for indicating the identification information of the service provider 100, an RND1 field, which indicates a random number, a TS1 field for indicating time information regarding the first transmission of the service provider 100, a MAC1 field, etc., as illustrated in FIG. 5B. The MAC1 field includes a MAC operation having been performed for data listed within the parentheses of FIG. 5B utilizing an encryption key KU shared between the UIM 120 and the service provider 100.

The terminal 110 adds an ID_T field, which indicates the identification information of the terminal 110, to the authentication request message received from the service provider 100, and performs an MAC operation. Then, in step 430, the terminal 110 transmits result values obtained by performing the MAC operation to the service provider 100, together with the authentication response message from the UIM 120. Herein, the format of the authentication response message transmitted to the service provider 100 further includes a MAC2 field, which has the result values obtained by performing the MAC operation in the terminal 110 and is added to the message from the UIM 120, as illustrated in FIG. 5C. The MAC2 field indicates results obtained by performing the MAC operation for corresponding data by means of an encryption key KT, such as a symmetric key shared between the terminal 110 and the service provider 100.

After receiving the authentication response message, the service provider 100 verifies the MAC1 field and the MAC2 field in order to perform authentication for the terminal 110 and the UIM 120. If the service provider 100 succeeds in authentication of the UIM 120 through the verification, the service provider 100 authenticates the UIM 120 and generates a Proof_U field reporting the success of the authentication. The Proof_U field indicating the success of the authentication is configured by ID_U||"Success". However, if the service provider 100 fails to authenticate the UIM 120, the service provider 100 generates a Proof_U field configured by ID_U||"Fail". Likewise, the service provider 100 verifies the MAC2 field for the terminal 110. If the service provider 100 succeeds in the verification of the MAC2 field, the service provider 100 generates a Proof_T field indicating the success of the authentication for the terminal 110. The Proof_T field indicating the success of the authentication is configured by ID_T||"Success". However, if the service provider 100 fails to verify the MAC2 field, the service provider 100 generates a Proof_T field configured by ID_T||"Fail".

If the Proof_U field and the Proof_T field, which indicate the authentication result information of the terminal 110 and the UIM 120, are generated, the service provider 100 generates both an E (KU, KUT||KUS) field and an E (KT, KUT) field. The E (KU, KUT||KUS) field indicates an operation for encrypting a shared encryption key (KUT) and a session key (KUS) utilizing an encryption key (KU) shared with the UIM 120, and the E (KT, KUT) field indicates an operation for encrypting the shared encryption key KUT utilizing the encryption key KT shared between the terminal 110 and the service provider 100. The KUT indicates an encryption key shared between the terminal 110 and the UIM 120, which is generated by the service provider 100 while the authentication protocol is executed. The KUS indicates a session key shared between the UIM 120 and the service provider 100, which is generated from the result of the execution of the authentication protocol. Herein, the encrypted information field may be briefly expressed by E (K, D), which represents an operation for encrypting the data D utilizing the encryption key K. Herein, the E represents encryption and is an abbreviation for encryption.

If the service provider 100 fails to authenticate the UIM 120, the E (KU, KUT∥KUS) field is omitted. Likewise, if the service provider 100 fails to authenticate the terminal 110, an authentication result message having no E (KT, KUT) field is generated. If the service provider 100 succeeds in authentication of the terminal 110 and the UIM 120 through the process as described above, the service provider 100 generates an authentication result message, as illustrated in FIG. 5d. Herein, since the message transmitted from the service provider 100 corresponds to the second message, the message includes a TS2 field indicating second transmission time.

In step 440, the service provider 100 transmits the authentication result message generated through the process as described above to the terminal 110.

After receiving the authentication result message, the terminal 110 transfers the authentication result message to the UIM 120. That is, the terminal 110 transfers the authentication result message, which is received from the service provider 100, to the UIM 120, thereby enabling the authentication of the terminal 110 to be performed by the UIM 120. As described above, the authentication result message is transferred to the terminal 110 and the UIM 120, so that the UIM 120 and the terminal 110 perform mutual authentication through verification of the authentication result message.

In detail, the terminal 110 verifies the TS2 field of the authentication result message. If the time information value does not exist within the predetermined range, the terminal 110 informs the UIM 120 and a user that the authentication result message is not correct, and simultaneously stops related operations. However, if the time information value exists within the predetermined range, the terminal 110 performs MAC verification of the authentication result message. If the terminal 110 fails to perform MAC verification, the terminal 110 informs the UIM 120 and the user of the failure of the MAC verification, and simultaneously stops related operations.

However, if the terminal 110 succeeds in the MAC verification, the terminal 110 checks the Proof_U field of the authentication result message and determines if the UIM 120 is a correct module through the authentication result information of the Proof_U field. If the authentication result information on the UIM 120 indicates "Fail", the terminal 110 transmits an error message to the UIM 120 and the user, and stops related operations. However, if the authentication result information on the UIM 120 indicates "Success", the terminal 110 determines that the authentication of the UIM 120 is successful, and completes the authentication process.

Then, the terminal 110 checks the E (KT, KUT) field of the authentication result message. To this end, the terminal 110 decrypts the KUT by means of the encryption key KT shared with the service provider 100, wherein the KUT represents a key which must be shared between the UIM 120 and the terminal 110. In this way, the terminal 110 can acquire the shared key KUT with the UIM 120.

After the terminal 110 acquires the shared key KUT, the terminal 110 transfers the authentication result message as illustrated in FIG. 5D to the UIM 120, in step 450. In the format of the message of FIG. 5d transferred in step 450, the E (KT, KUT) field and the MAC2 {E(KT, KUT)∥Proof_U∥TS2} field may be omitted.

Then, the UIM 120 also verifies the TS2 field of the authentication result message. If the time information value does not exist within the predetermined range, the UIM 120 informs the terminal 110 that the authentication result message is not correct, and simultaneously stops related operations. However, if the time information value exists within the predetermined range, the UIM 120 performs MAC verification of the authentication result message.

If the UIM 120 succeeds in the MAC verification, the UIM 120 checks the Proof_U field of the authentication result message and determines if the terminal 110 is a correct terminal through the authentication result information of the Proof_U field. If the authentication result information on the terminal 110 indicates "Fail", the UIM 120 transmits an error message the terminal 110, and stops related operations. However, if the authentication result information on the terminal 110 indicates "Success", the UIM 120 determines that the authentication of the terminal 110 is successful.

Then, the UIM 120 checks the E (KU, KUS∥KUT) field of the authentication result message. To this end, the UIM 120 decrypts the shared encryption key KUT and the session key KUS utilizing the encryption key KU shared with the service provider 100, thereby acquiring the KUT and the KUS. In this way, the authentication process is completed. Accordingly, the UIM 120 has not only the session key KUS commonly shared with the service provider 100, but also the key KUT commonly shared with the terminal 110. Such KUS and KUT are separately stored in secure storage areas, thereby blocking inappropriate access.

Hereinafter, the public key-based mutual authentication method will be described with reference to FIG. 6 illustrating the format of a message exchanged among a service provider, a terminal and a UIM according to another embodiment of the present invention.

Before a description about the public key-based mutual authentication method is given, it is assumed that the service provider, the terminal and the UIM have previously received a public key and a secret key in a public key-based structure according to another embodiment of the present invention, and they utilize the public key and the secret key in mutual authentication.

The public key-based mutual authentication process is the same as the authentication process of FIG. 4. However, in the public key-based mutual authentication process, the format of a message is partially altered. Accordingly, both an authentication request message, which is transmitted from the service provider 100 to the UIM 120 via the terminal 110, and an authentication response message, which is generated by the UIM 120 in response to the authentication request message, have the same formats as those of the messages in the case of the symmetric key-based mutual authentication process. That is, the authentication request message has the format as illustrated in FIG. 5A, and the authentication response message has the format as illustrated in FIG. 5B.

However, the terminal 110 adds an ID_T field, which indicates its own identification information, and a Sign_T (ID_SP∥RND1∥T1∥ID_T) field, which indicates its own electronic signature, to the authentication response message received from the UIM 120, and then transmits the authentication response message to the service provider 100. That is, the authentication response message transmitted from the terminal 110 to the service provider 100 has the format as illustrated in FIG. 6A.

The service provider 100 inserts authentication results of the terminal 110 and the UIM 120 into the received authentication response message, and transmits the authentication response message to the terminal 110. Herein, the service provider 100 generates a shared encryption key KUT, which is to be used between the terminal 110 and the UIM 120, and a new shared session key KUS between the service provider 100 and the UIM 120, as well as the authentication results. Then, the service provider 100 transmits an authentication result message to the terminal 110, wherein the authentication result message includes data E (KU, KUS‖KUT) obtained by encrypting the generated KUS and KUT utilizing an encryption key KU. Further, the authentication result message further includes information, which is obtained by encrypting the KUT utilizing the public key PK_T of the terminal 110, and a Sign_SP {E(PK_T, KUT)‖Proof_U‖TS2} field, which indicates the electronic signature of the service provider 100 for the authentication result Proof_U of the UIM 120. The authentication result message has the format as illustrated in FIG. 6B, which is also transferred to the UIM 120 through the terminal 110.

If the authentication result message is received, the terminal 110 and the UIM 120 perform mutual authentication. If such authentication is completed, the UIM 120 has both the session key KUS commonly shared with the service provider 100, and the shared encryption key KUT commonly shared with the terminal 110. Accordingly, the terminal 110 and the UIM 120 separately store the KUT in secure storage areas.

Figure 7:
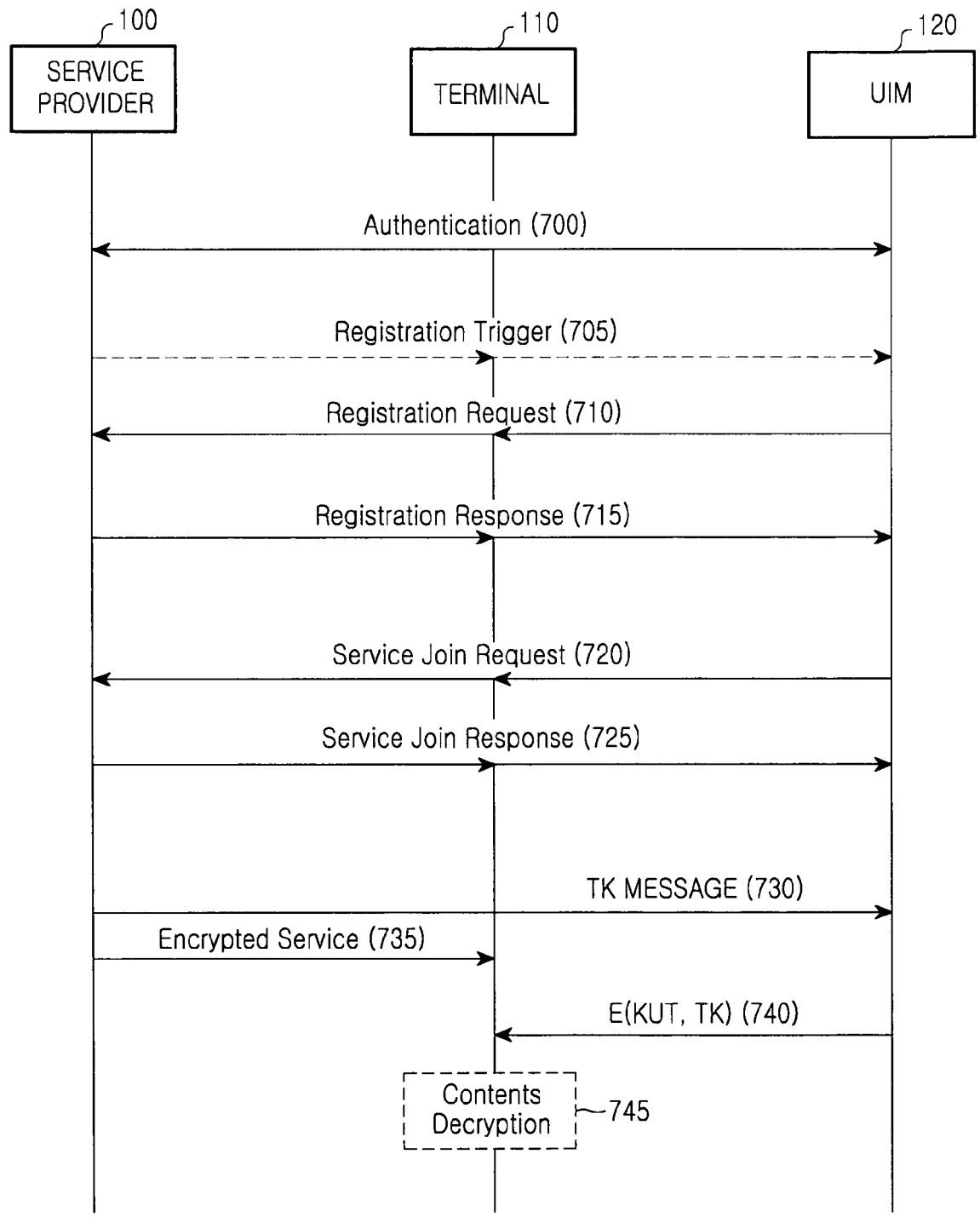
FIG. 7 is a ladder diagram illustrating a service joining process according to the present invention.

Hereinafter, a process for actually joining a service after the authentication is completed will be described with reference to FIG. 7 illustrating the service joining process according to the present invention.

Figure 8A:
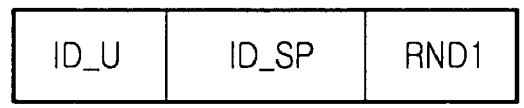
FIGS. 8A-8E are diagrams illustrating the format of a message exchanged among a service provider, a terminal and a UIM in a service joining process according to the present invention.

Referring to FIG. 7, in step 700, the previously described authentication process is performed among the service provider 100, the terminal 110 and the UIM 120. That is, if the authentication is performed in the same way as illustrated in FIG. 4, the service provider 100 performs a registration trigger with the terminal 110 and the UIM 120, in step 705. Herein, the service provider 100 transfers a registration trigger message to the terminal 110. Then, the terminal 110 transfers the registration trigger message to the UIM 120. In step 710, the UIM 120 transfers a registration request message as illustrated in FIG. 8A to the service provider 100 via the terminal 110. The registration trigger message indicates if the service provider 100 exists, and may be omitted.

Figure 8B:
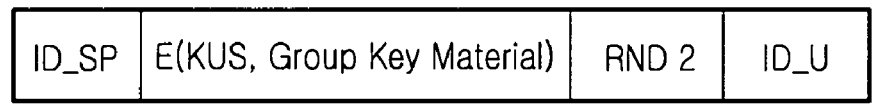

In step 715, the service provider 100 generates a registration response message as illustrated in FIG. 8B and transfers the registration response message to the UIM 120 through the terminal 110, in response to the registration request message. Then, the UIM 120 analyzes the E (KUS‖Group Key Material) field of the registration response message. In detail, the UIM 120 decrypts the group key information of the Group Key Material field utilizing the shared session key KUS provided in advance. In this way, the UIM 120 can acquire a group key (GK) from the decrypted group key information, stores the group key in a secure storage area, e.g. a Tamper Resistance Module (TRM), and blocks inappropriate access. In conventional systems, such a group key has been used only for terminals restricted by the domain concept. However, the present invention proposes a method for allowing the UIM 120 to have the group key so that the UIM 120 can function in a different terminal when the UIM 120 is inserted into the different terminal.

Figure 8C:
Figure 8D:
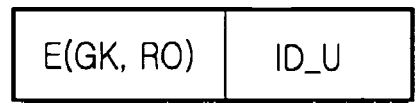
Figure 8E:
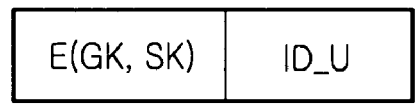

If the registration is completed, the UIM 120 transfers a service join request message as illustrated in FIG. 8C to the service provider 100 via the terminal 110, in step 720. Then, the service provider 100 transfers a service join response message as illustrated in FIG. 8D or 8E to the UIM 120 via the terminal 110, in response to the service join request message. The UIM 120 decrypts an RO utilizing the group key GK in the service join response message, thereby acquiring a service key SK included in the RO. The acquired RO or SK is stored in a secure storage area such as the TRM of the UIM 120.

Accordingly, the UIM 120 acquires the RO or the service key for the use of content through the service joining process as described above. After the service key is acquired, when encrypted content is actually provided, the UIM 120 provides the terminal 110 with a traffic key TK for allowing the content to be reproduced in the terminal 110, so that the encrypted content can be decrypted. In this way, it is possible to reproduce content purchased by a user in the terminal 110 by means of the UIM 120.

In detail, after the UIM 120 acquires the RO or the service key, the service provider 100 transfers a TK message encrypted by a service key to the terminal 110, in step 730. The terminal 110 transfers the TK message to the UIM 120. In step 735, the service provider 100 provides the terminal 110 with an encrypted service actually corresponding to content. The UIM 120 decrypts an encrypted traffic key utilizing the service key acquired in the service joining process. In step 740, the UIM 120 encrypts and transfers the traffic key utilizing the encryption key KUT shared with the terminal 110 in the authentication process.

Then, the terminal 110 also decrypts the traffic key TK received from the UIM 120 utilizing the shared encryption key KUT with the UIM 120 acquired in the authentication process, thereby acquiring the traffic key. In step 745, the terminal 110 decrypts the encrypted content utilizing the traffic key acquired in step 745, thereby reproducing the content. If the encryption key KUT is shared between the terminal 110 and the UIM 120 through the authentication process as described above, it is possible to use the same content in a plurality of terminals owned by a user.

In the meantime, it may be possible to consider a case in which a user wants to independently use a service, which the user has joined, in a specific terminal by means of a UIM after trigger registration and service joining. That is, when the user uses corresponding content in a certain terminal, replaces the terminal with another terminal, and then wants to use the content in the other terminal utilizing the UIM, it is necessary to perform the previous authentication process.

If the authentication process is not performed after change in the terminal, the UIM and the changed terminal may have different shared encryption keys or may not have any shared encryption keys. Accordingly, even when the UIM provides the terminal with a traffic key encrypted by a shared encryption key, it is difficult to acquire the traffic key if the terminal has different shared encryption keys. Therefore, it is impossible to reproduce corresponding content.

Accordingly, in order to easily use content based on user identification through the use of a license regardless of a specific terminal, when the user has inserted the UIM into a different terminal, the changed terminal and the UIM must have the same shared encryption key. In order to acquire a new shared encryption key, it is necessary to perform a general authentication process among the changed terminal, the UIM and the service provider. That is, the symmetric key-based authentication process or the public key-based authentication process as described above must be performed. If such an authentication process is performed, the terminal 110 and the UIM 120 can have the same shared encryption key. Consequently, it is possible to reproduce corresponding content.

In the meantime, when a terminal having joined a service does not want to use the content any more, the terminal may cancel the service. When the terminal wants to cancel the service, the following procedure is performed. Hereinafter, the procedure will be described with reference to FIG. 9 illustrating the service termination process according to the present invention, and FIG. 10 illustrating the format of a message exchanged in the service termination process according to the present invention.

Figure 9:
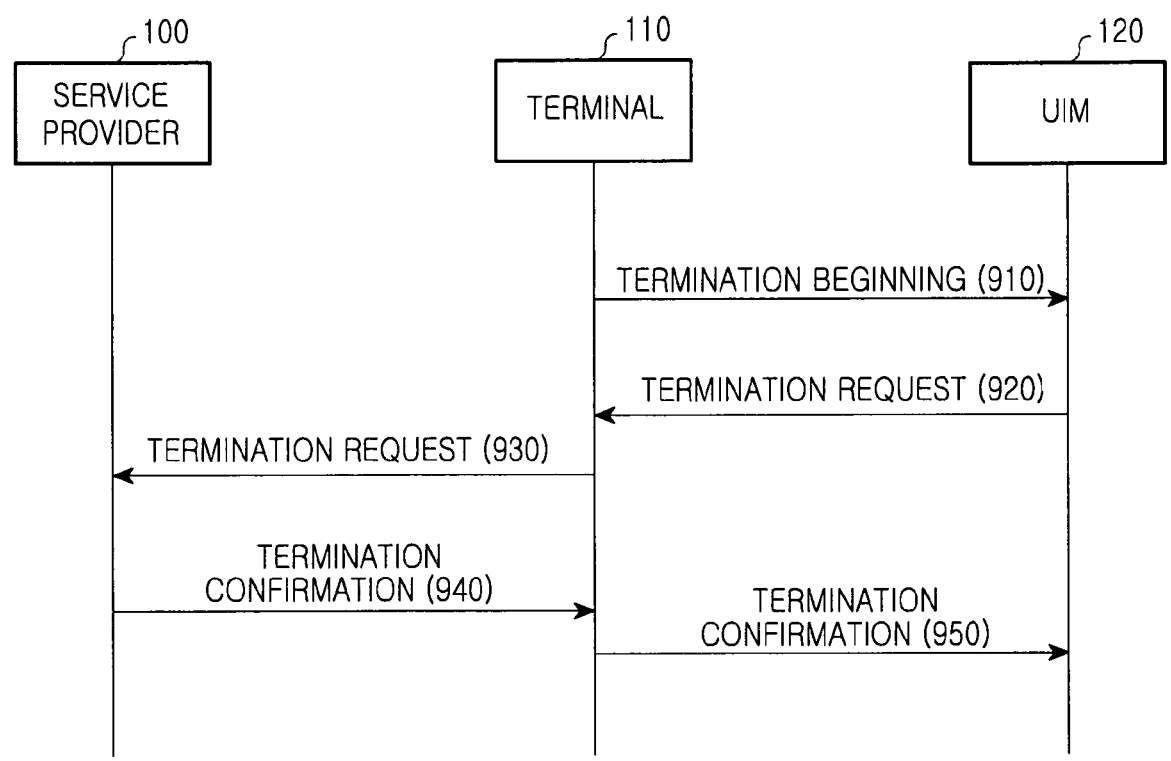
FIG. 9 is a ladder diagram illustrating a service termination process according to an embodiment of the present invention.

Referring to FIG. 9, if the service termination process begins through selection of a termination function by a user, the terminal 110 transfers a termination beginning message to the UIM 120 in step 910. The termination beginning message has the format illustrated in FIG. 10Aa. In step 920, the UIM 120 generates a termination request message by adding the identification information of the UIM 120 and the result values of the MAC operation to the termination beginning message received from the terminal 110, and transfers the termination request message to the 110. The termination request message has the format illustrated in FIG. 10B, which includes an ID_Service field indicating the name of a service to be terminated.

If the termination request message is received from the UIM 120, the terminal 110 transfers the termination request message to the service provider 100 in step 930. Then, the service provider 100 performs the termination procedure of a specific service connected to the UIM 120 through the termination request message. In step 940, the service provider 100 transfers a termination confirmation message to the terminal 110. The termination confirmation message has the format illustrated in FIG. 10C, and the Result field of the termination confirmation message has result values of the termination operation.

In step 950, the terminal 110 transfers the received termination confirmation message to the UIM 120. The UIM 120 verifies an MAC filed of the termination confirmation message and then transfers the termination confirmation message to the terminal 110, so that the service can be terminated.

According to the present invention as described above, it is possible to reproduce content purchased by a user in a plurality of terminals utilizing a UIM. Further, security for both the UIM and the terminal is accomplished, so that it is possible to easily use content based on user identification through the use of a license regardless of a specific terminal.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for reproducing equal content in at least one terminal by generally authenticating a service provider, a terminal and a User identity Module (UIM), the method comprising the steps of:
   performing, by the terminal and the UIM, mutual authentication through the service provider, thereby acquiring an encryption key shared between the terminal and the UIM;
   after the authentication, performing by the UIM registration to acquire a group key from the service provider;
   if the registration is completed, transferring by the UIM a service join request message to the service provider through the terminal, thereby joining a service; and
   if encrypted content is transferred from the terminal to the service provider after joining the service, decrypting and reproducing the encrypted content utilizing the shared encryption key.

2. The method as claimed in claim 1, wherein the authentication is performed based on public key-based authentication or symmetric key-based authentication.

3. The method as claimed in claim 2, wherein the authentication comprises:
   transferring by the service provider an authentication request message to the UIM through the terminal;
   performing verification for an authentication response message received in response to the authentication request message, performing the authentication for the terminal and the UIM, and generating and transmitting an authentication result message; and
   performing the mutual authentication by the terminal and the UIM by means of the authentication result message.

4. The method as claimed in claim 3, further comprising, in the symmetric key-based authentication:
   if the authentication request message is transferred to the UIM, inserting by the UIM information obtained by performing a Message Authentication Code (MAC) operation utilizing a symmetric key of the UIM in the authentication request message, thereby generating the authentication response message; and
   if the generated authentication response message is transferred to the terminal, adding by the terminal identification information of the terminal to the authentication response message, and transmitting information obtained by performing a MAC operation, together with the authentication response message.

5. The method as claimed in claim 3, further comprising, in the public key-based authentication:
   if the authentication request message is transferred to the UIM, inserting by the UIM information obtained by performing a MAC operation utilizing a symmetric key of the UIM in the authentication request message, thereby generating the authentication response message; and
   if the generated authentication response message is transferred to the terminal, adding by the terminal identification information of the terminal to the authentication response message, and transmitting information obtained by signing an electronic signature to the service provider, together with the authentication response message.

6. The method as claimed in claim 3, wherein the step of generating and transmitting the authentication result message comprises:
   generating and transmitting the authentication result message including both information, which is obtained by encrypting the shared encryption key generated by the service provider to be used between the terminal and the UIM, and information, which is obtained by encrypting a new shared session key generated between the service provider and the UIM utilizing a shared key between the service provider and the UIM.

7. The method as claimed in claim 3, further comprising:
   when the UIM verifies the received authentication result message, confirming and verifying time information and MAC operation information within the authentication result message;
   if the verification is successful, determining if the authentication of the terminal is a success or a failure; and
   if the authentication of the terminal is successful, acquiring a shared session key with the service provider from the authentication result message.

8. The method as claimed in claim 1, wherein the step of performing the registration comprises:
   if a registration trigger message is received from the service provider after the authentication, receiving by the UIM the registration trigger message through the terminal;
   transferring a registration request message to the service provider through the terminal in response to the registration trigger message; and
   if a registration response message is received from the service provider through the terminal in response to the registration request message, acquiring the group key utilizing a shared session key with the service provider, which is obtained in the authentication.

9. The method as claimed in claim 1, wherein the step of joining the service comprises:
transferring by the UIM the service join request message to the service provider through the terminal;
receiving a service join response message from the service provider in response to the service join request message; and
acquiring a key utilizing the group key, which is obtained in the registration, from the received service join response message.

10. The method as claimed in claim 9, wherein the service key is for encrypting a traffic key having actually encrypted content.

11. The method as claimed in claim 1, wherein the step of decrypting and reproducing the encrypted content comprises:
after joining the service, receiving by the terminal a message from the service provider and transferring the received message to the UIM, wherein the message is obtained by encrypting a traffic key, which actually encrypts the content, utilizing service key;
decrypting by the UIM the traffic key utilizing the service key, there by acquiring a traffic key;
encrypting the traffic key utilizing the shared encryption key, and transferring the encrypted traffic key to the terminal; and
acquiring by the terminal the traffic key utilizing the shared encryption key, and decrypting and reproducing the encrypted content provided from the service provider utilizing the acquired traffic key.

12. The method as claimed in claim 1, further comprising when the UIM is inserted into a different terminal, performing by the terminal and the UIM the mutual authentication again through the service provider in order to acquire an equal shared encryption key between the different terminal and the UIM.

13. The method as claimed in claim 1, further comprising:
if a service termination request is received from a user, transferring a service termination beginning message by the terminal to the UIM;
if a service termination request message is received, transferring the service termination request message to the service provider, wherein the service termination request message is generated by adding identification information of the UIM and result information of a MAC operation to the service termination beginning message;
receiving a service termination confirmation message from the service provider, wherein the service termination confirmation message includes results obtained by performing a termination procedure for a predetermined service; and
transferring the service termination confirmation message to the UIM, receiving verification results from the UIM, and performing service termination.

14. A system for reproducing equal content in at least one terminal by generally authenticating a service provider, a terminal and a User Identity Module (UIM), the system comprising:
the service provider for performing authentication for the terminal and the UIM, performing a registration process for allowing the UIM to be used in said at least one terminal, reporting results for a service join request from the UIM through the terminal, and encrypting and providing corresponding content in service joining;
the terminal for transferring a message exchanged between the service provider and the UIM, acquiring a shared encryption key with the UIM through the authentication, and decrypting and reproducing the encrypted content, which is provided according to the service joining, utilizing the shared encryption key; and
the UIM for acquiring both the shared encryption key with the terminal and a shared session key with the service provider through the authentication, and providing the terminal with an encryption key for decrypting the encrypted content.

15. The system as claimed in claim 14, wherein the authentication is performed based on public key-based authentication or symmetric key-based authentication.

16. A terminal apparatus for reproducing equal content in at least one terminal by generally authenticating a service provider, a terminal and a User Identity Module (UIM), the terminal apparatus comprising:
a Digital Rights Management (DRM) module for managing registration, service joining, and use of content;
a communication module for receiving a message from the service provider, and transmitting a response message to the service provider in response to reception of the message;
an interface module for transferring the message received through the communication module to the UIM, and receiving a response message corresponding to the transferred message from the UIM; and
an authentication module for acquiring a shared encryption key with the UIM by performing authentication for the UIM, and decrypting encrypted content, which is provided according to the service joining, utilizing the shared encryption key.

17. The terminal apparatus as claimed in claim 16, further comprising an application module for receiving decrypted content from the DRM module and reproducing the decrypted content.

18. The terminal apparatus as claimed in claim 16, wherein the authentication module comprises:
an authentication manager module for managing an authentication function, and performing message generation and verification;
an encryption/decryption module for executing encryption and decryption operations;
a digital signature module for signing an electronic signature;
a Message Authentication Code (MAC) module for executing a MAC operation; and
a secure storage module for storing an encryption key,
wherein all of the encryption/decryption module, the digital signature module, the MAC module and the secure storage module correspond to submodules of the authentication manager.

19. The terminal apparatus as claimed in claim 16, wherein the DRM module comprises:
a registration module for executing operations according to a registration procedure;
a rights management module for managing interpretation and use of a Right Object (RO) acquired in the service joining
a key stream management module for executing decryption of an encrypted traffic key utilizing a service key; and
a content decryption module for executing decryption of encrypted content utilizing the traffic key.

20. A content reproduction method in a system for reproducing equal content in at least one terminal by generally authenticating a service provider, a terminal and a User Identity Module (UIM), the content reproduction method comprising the steps of:

acquiring, by the terminal, a second encryption key KUT between the terminal and the UIM from an authentication message including a procedure for encrypting the second encryption key KUT with a first encryption key KT between the terminal and the service provider, by using the first encryption key KT;

acquiring, by the UIM, the second encryption key KUT and a shared session key KUS between the UIM and the service provider from an authentication message including a procedure for encrypting the second encryption key KUT and the shared session key KUS with a third encryption key KU between the UIM and the service provider, by using the third encryption key KU; and decrypting, by the UIM, an encrypted group key GK included in a registration response message by using the acquired shared session key KUS, and decrypting content encrypted with a traffic key TK by using the decrypted group key GK.

21. The content reproduction method of claim 20, wherein the decrypting of the encrypted content comprises:

decrypting, by the UIM, a service key SK used to encrypt the traffic key TK by using the group key GK;

acquiring the traffic key TK by decrypting the encrypted traffic key TK by using the service key SK; and decrypting the encrypted content by using the acquired traffic key TK.

* * * * *